US006457626B1

(12) United States Patent
Sheehan et al.

(10) Patent No.: US 6,457,626 B1
(45) Date of Patent: Oct. 1, 2002

(54) SYMMETRIC ULTRASONIC ROTARY HORN

(75) Inventors: James F. Sheehan, Warren; Sylvio J. Mainolfi, Roxbury, both of CT (US)

(73) Assignee: Branson Ultrasonics Corporation, Danbury, CT (US)

( * ) Notice: Subject to any disclaimer, the term of this patent is extended or adjusted under 35 U.S.C. 154(b) by 0 days.

(21) Appl. No.: 09/772,122

(22) Filed: Jan. 29, 2001

(51) Int. Cl.$^7$ .......................... B23K 1/06; B23K 37/00; B23K 5/20
(52) U.S. Cl. ................. 228/1.1; 228/110.1; 156/73.1; 156/580.1
(58) Field of Search .............................. 228/1.1, 110.1, 228/4.5, 180.5; 156/73.1, 580.1, 580.2

(56) References Cited

U.S. PATENT DOCUMENTS

| | | | |
|---|---|---|---|
| 5,087,320 A | * | 2/1992 | Neuwirth .................. 156/580.1 |
| 5,095,188 A | * | 3/1992 | Klein ...................... 219/121.14 |
| 5,096,532 A | * | 3/1992 | Neuwirth et al. ......... 156/580.1 |
| 5,110,403 A | * | 5/1992 | Ehlert ....................... 156/580.1 |
| 5,645,681 A | * | 7/1997 | Gopalakrishna et al. . 156/580.1 |
| 5,707,483 A | * | 1/1998 | Nayar et al. .............. 156/580.2 |
| 5,871,605 A | * | 2/1999 | Bett ........................... 156/73.1 |
| 5,976,316 A | * | 11/1999 | Mlinar et al. ............ 156/580.1 |
| 6,059,923 A | * | 5/2000 | Gopalakrishna ......... 156/580.2 |
| 6,099,670 A | * | 8/2000 | Louks et al. ............. 156/580.2 |
| 6,149,755 A | * | 11/2000 | McNichols et al. ......... 156/264 |
| 6,222,131 B1 | * | 4/2001 | Schilson ................ 174/117 FF |

FOREIGN PATENT DOCUMENTS

| | | | |
|---|---|---|---|
| JP | 4-267130 A | * | 9/1992 |
| JP | 05-131174 A | * | 5/1993 |

* cited by examiner

Primary Examiner—M. Alexandra Elve
Assistant Examiner—L. Edmondson
(74) Attorney, Agent, or Firm—Harness, Dickey & Pierce, P.L.C.

(57) ABSTRACT

An ultrasonic rotary horn has tapered input sections for the conversion of axial acoustic energy into radial acoustic energy. The preferred rotary horn includes a first half having a first radial weld section and a first axial input section for receiving a first axial acoustic energy. The rotary horn further includes a second half coupled to the first half. The second half has a second radial weld section and a second axial input section for receiving a second axial acoustic energy. Each half has a coned section defined by an inner tapered surface and an outer tapered surface such that the halves convert a portion of the first and second axial acoustic energy into radial acoustic energy. Each inner tapered surface forms an inner angle with respect to an axis of the horn and each outer tapered surface forms an outer angle with respect to the axis.

18 Claims, 6 Drawing Sheets

SYMMETRIC ULTRASONIC ROTARY HORN

TECHNICAL FIELD

The present invention relates generally to ultrasonic welding. More particularly, the invention relates to an ultrasonic rotary horn having tapered axial input sections for the conversion of axial acoustic energy into radial acoustic energy.

BACKGROUND

Acoustic welding, and more particularly ultrasonic welding, has become increasingly popular in a number of industries. For example, businesses in the textile and personal products industries often manufacture products such as diapers, clothing, etc., that are ultrasonically welded. Ultrasonic welding tools operate under the principle of applying acoustic energy in the ultrasonic frequency range (i.e., at or above 20 kHz) to a horn. The horn vibrates in response to the applied acoustic energy to further produce an output acoustic energy. The output acoustic energy is applied to the materials (typically thermoplastics) being joined by positioning the horn in the vicinity of the parts. The vibrational energy travels through the parts, and at the interface between the parts, is converted to heat. The conversion is due to intermolecular friction that melts and fuses the parts together.

While a number of horn configurations have been developed, it is well known that a good way to attain high quality and high speed ultrasonic welds is to use a rotary horn with a rotating anvil. Typically, a rotary horn is cylindrical and rotates around an axis. The input acoustic energy is in the axial direction and the output acoustic energy is in the radial direction. The horn and anvil are essentially two cylinders positioned close to each other, rotating in opposite directions with equal or nonequal tangential velocities. The parts to be bonded pass between these cylindrical surfaces at a linear velocity which usually matches the tangential velocity of these cylindrical surfaces. Matching the tangential velocities of the rotary horn and the anvil with the linear velocity of the parts can minimize the drag between the horn and the parts.

Rotary horns are therefore typically made up of at least an axial input section and a radial weld section. The input section receives the axial acoustic energy, while the weld section applies the converted radial acoustic energy to the target parts. While the above-described conventional rotary horn is acceptable for some applications, certain important difficulties remain. One difficulty relates to the desire to obtain a high level of amplitude uniformity. Amplitude uniformity is effectively a measure of the percent of the weld receiving the same amount of weld energy. Specifically, amplitude uniformity is determined by measuring the maximum displacement of the external surface of the weld section (i.e., the weld "face") for a given input excitation. The minimum displacement for the same excitation is also measured, and the ratio of the minimum displacement to the maximum displacement represents the amplitude uniformity. Thus, a rotary horn with an amplitude uniformity approaching one hundred percent would produce very uniform output acoustic energy over its entire weld face. High amplitude uniformity results in more predictable welds and ultimately lower manufacturing costs.

Some conventional rotary horns have an input section that is solid, and has a nodal point. Others have an input section that is hollow and has a nodal plane. All conventional rotary horns, convert axial acoustic energy into radial acoustic energy through the Poisson ratio effect and a number of top and bottom tuning cuts strategically machined out of the weld section. While the tuning cuts allow the conventional rotary horn to achieve acceptable uniformity levels (on the order of 85 percent or greater), this level of uniformity comes at a cost. Specifically, the machining of the tuning cuts is often quite complicated and requires additional tooling and labor.

Another difficulty associated with conventional rotary horns relates to weld area lengths. Essentially, the weld area length is a measure of the amount of product that can be welded in a given pass of the rotary horn. Thus, larger weld area lengths enable greater product throughput and increased profitability. In order to provide increased weld area lengths it is generally necessary to increase the weld area length of the weld section. Many conventional radial horns have. weld area lengths that are limited to approximately 2.5 inches. Using such a horn on an application requiring weld area lengths of approximately 5 inches would therefore require twice as much welding time and labor. It is therefore desirable to provide a rotary horn that has a minimum amplitude uniformity of 85 percent while maintaining a radial weld area length of 5 inches or more.

Yet another difficulty associated with conventional acoustic rotary horns relates to driving and mounting of the horn. For example, many conventional horns have a single input section for receiving the axial acoustic energy. This single input section serves as the only mechanism for driving the horn with the axial acoustic energy and limits the overall usefulness of the horn to half-wave applications. Furthermore, the horn must be mounted on one side of the weld area. When mounted in this fashion, the horn is loaded in the same manner as a cantilever beam. Conventional single mount designs have been estimated to produce weld forces of 150 pounds or less before deflections become too excessive and cause uneven welding. The result is often a lower pressure weld which, in turn, results in less ultrasonic energy being imparted to the target parts. Less ultrasonic energy being imparted to the weld surface ultimately reduces product line speeds. It is therefore desirable to provide a rotary horn that has mounts located on each side of the weld area, in the same manner as a simply supported beam, to increase weld pressure and the transfer of acoustic energy to the welded parts. The simply supported horn can support five times as much force as the cantilever style mounting method for the same deflection. The mounts in the simply supported mounting method could be polar or nodal mounts.

The above and other objectives are provided by an ultrasonic rotary horn in accordance with the present invention. The rotary horn has a first radial weld section, and a first axial input section operatively coupled to the first radial weld section for receiving a first axial acoustic energy. The first axial input section has a first coned section such that the first axial input section and the first radial weld section convert a portion of the first axial acoustic energy into radial acoustic energy. The radial acoustic energy is in phase with the first axial acoustic energy. The use of a tapered geometry for the first axial input section allows the rotary horn to be designed without reliance on the Poisson ratio effect and complicated tuning cuts.

Further in accordance with the present invention, an ultrasonic rotary horn having two polar mounts is provided. The rotary horn includes a first half having a first radial weld section and a first axial input section for receiving a first axial acoustic energy. The rotary horn further includes a second half coupled to the first half. The second half has a second radial weld section and a second axial input section for receiving a second axial acoustic energy. Each half has a coned section such that the halves convert a portion of the first and second axial acoustic energy into radial acoustic energy. Providing multiple polar mounts improves the weld pressure and therefore increases the ultrasonic energy imparted to the materials being welded.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute part of this specification. The drawings illustrate various features and embodiments of the invention, and together with the description serve to explain the principles and operation of the invention.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
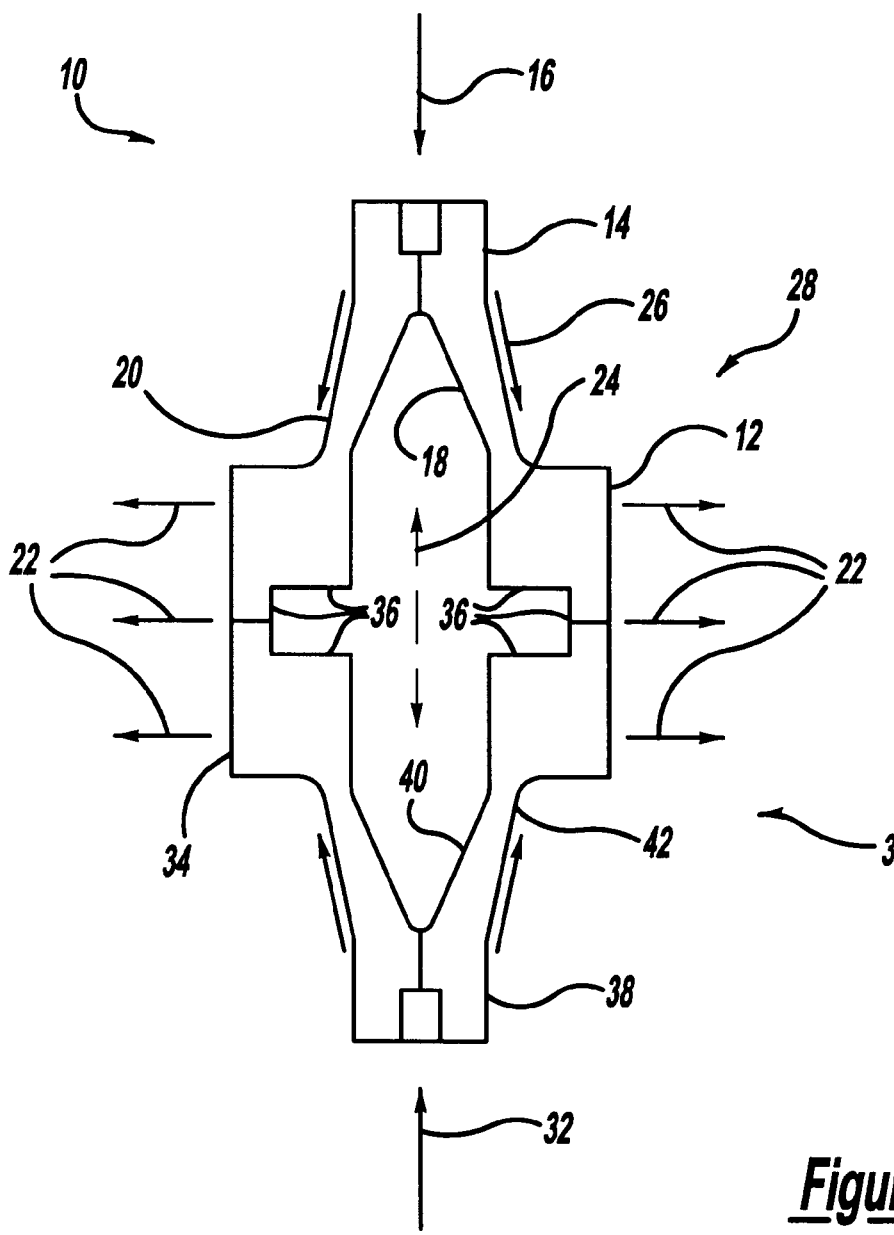
FIG. 1 is a sectional view of an ultrasonic rotary horn according to a preferred embodiment of the present invention.

Turning now to FIG. 1, the preferred ultrasonic rotary horn 10 for joining an assembly of parts is shown. It will be appreciated that while the horn 10 will be described with respect to the welding of a plurality of thermoplastic parts (not shown), the present invention is not so limited. In fact, the rotary horn 10 is useful in a wide variety of applications both inside and outside the film and fabric sealing industry.

It can be seen that generally the horn 10 has a first radial weld section 12, and a first axial input section 14. The first axial input section 14 is operatively coupled to the first radial weld section 12 for receiving a first axial acoustic energy 16. As will be described in greater detail below, the first radial weld section 12 and the first axial input section 14 are preferably a unified piece machined out of the same base material (such as titanium). The first axial input section 14 has a first coned section defined by an inner tapered surface 18 and an outer tapered surface 20 such that the first axial input section 14 and the first radial weld section 12 convert a portion of the first axial acoustic energy 16 into radial acoustic energy 22.

It will be appreciated that axial ultrasonic energy/motion is input from one or two areas. The direction of energy/motion for these axial ultrasonic energy inputs is shown as the +−Y direction. A suitable half wave axial resonator and/or axial converter can be attached to the ultrasonic rotary horn in one or both of these areas.

Ultrasonic energy/motion is output from the horn in the areas shown. The output ultrasonic energy is in the radial direction or +−X direction in the diagram. The general theory of the rotary horn is as follows:

1) Axial ultrasonic energy/motion (+−X direction) is input through one or both of the axial input areas; and
2) A portion of this axial ultrasonic energy/motion is converted into radial energy/motion at the radial output surface. This energy/motion is then used to perform various operations which require ultrasonic energy (film/fabric sealing, plastics joining).

It is important to note that only a portion of the ultrasonic input energy/motion is converted into radial energy/motion. The unconverted energy/motion is not lost but placed in a storage state within the horn. A more detailed explanation of this storage is presented below.

DETAILED THEORY OF OPERATION

Essentially the full ultrasonic horn is made up of two identical and symmetrical half sections (or halves) shown in FIG. 1. Both of these half sections behave in an identical and symmetric manner. The theory of operation will be explained for one of these two sections. The theory will then be expanded to include the operation of both sections when joined together. An axisymmetric view of one of the half sections is shown in greater detail in FIG. 2 at 44.

Each half section 44 is made up of two half wavelength sections 46, 48. Axial (+−Y direction) ultrasonic energy/motion is input into the straight section of the first half wavelength section 46. The energy/motion is transmitted through the coned section to the end of the first half wavelength section 46. The coned section is characterized by a first angle (inner taper angle) and a second angle (outer taper angle). The effect of the coned section is to transmit the input energy/motion at an angle to the centerline axis of the horn. The coned section in essence transforms pure axial energy/motion (+−Y direction) into combination energy/motion in both the axial (+−Y direction) and radial (+−X direction) directions.

The combined energy/motion in the axial and radial direction is seen at a transition area 58. In the transition area 58, the horn material begins to show movement in the radial direction. As will be discussed below, pure axial energy/motion in this area is confined to an area at the inner diameter of the coned section.

The second half wavelength section 48 is essentially a cylinder, which is tuned to oscillate in the radial direction. The resultant radial energy/motion from the transition area 58 excites this radial mode and moves the entire section 48 in a radial manner.

The axial energy, which enters the second half wavelength section 48 from the transition area 58, is confined to the inner diameter of the cylinder. This energy/motion oscillates the horn material in the +−Y direction. The material in this area also oscillates in the radial direction (+−X direction) since the entire cylinder is oscillating in this manner. It is important to note that although the axial motion in this area will not be used to perform work (ex. welding) the energy is not lost. The axial energy in this area is merely put into a storage state.

Figure 3:
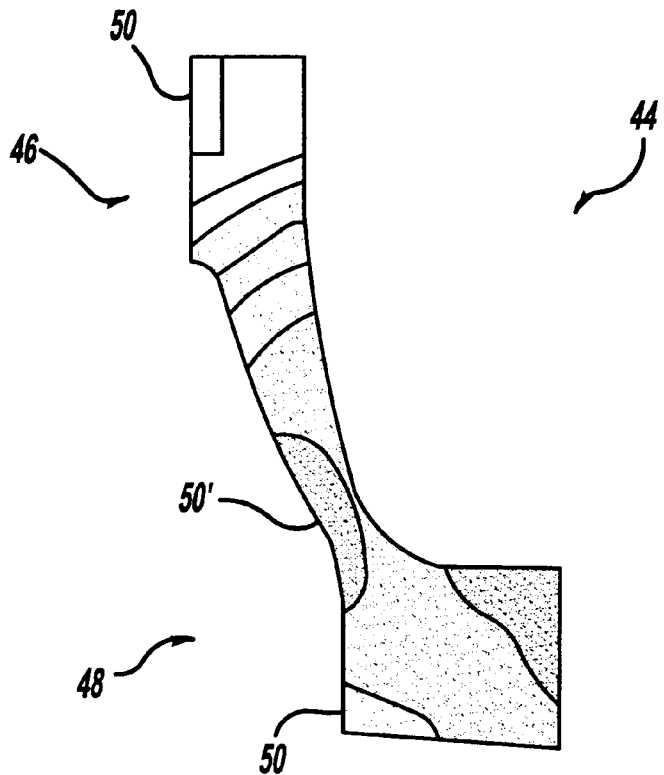
FIG. 3 is a finite elements analysis (FEA) plot of a half section showing axial displacements.

A finite elements analysis (FEA) plot showing the displacements in the axial direction (+−Y direction) is shown in FIG. 3. This plot shows the high axial displacement regions 50 (high velocity areas) and low displacements regions (nodes). It is important to note that high axial displacement region 50' has a large negative value, whereas regions 50 have large positive values. A plot displaying axial node locations 52 is shown in FIG. 4.

Figure 4:
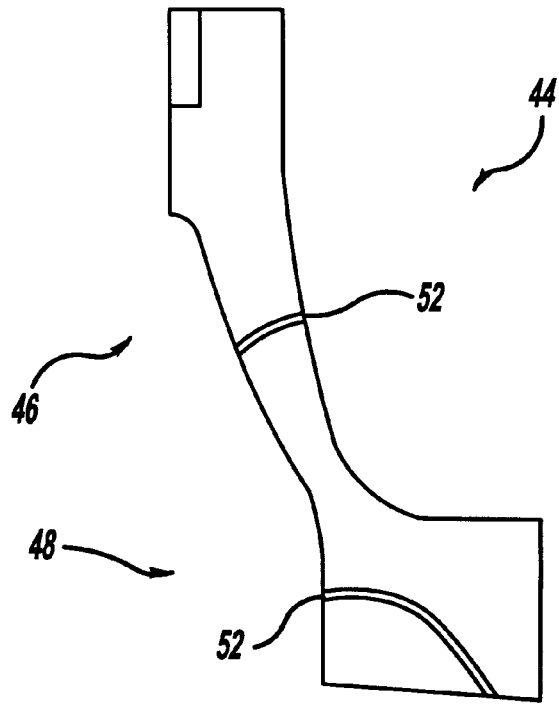
FIG. 4 is a FEA plot of a half section showing axial nodes according to one embodiment of the present invention.

FIGS. 3 and 4 illustrate that the axial motion is essentially confined to the inner diameter of the horn from the transition area down. Pure radial motion is confined to the horn area below the transition area. The fact that there are two axial nodes present shows that there are two half wavelength axial sections 46, 48 to this half section 44. FIGS. 3 and 4 also show the relative phasing between different areas on the half section. The phasing of different areas of motion on the horn is important for two reasons:

1) They will determine the method to join the horn to a mirror image of itself; and 2) They are useful in distinguishing the horn of the present invention from similar radial motion horns.

The axial displacement plot of FIG. 3 shows the input energy/motion in the positive Y direction. Material moving in the axial direction in the transition section moves in the negative Y direction, or 180° out of phase. The material on the bottom inner diameter of the horn moving in the axial direction is moving in the positive Y direction, or in phase with the input motion.

Figure 5:
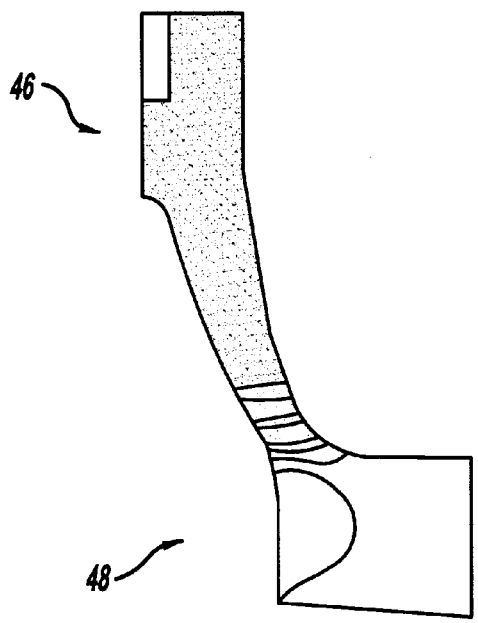
FIG. 5 is a FEA plot of a half section showing radial displacements according to one embodiment of the present invention.

FIG. 5 therefore shows that the horn material in the second half wavelength section 48 moving in the radial direction is moving in the positive X direction. This radial motion is in phase with the input motion. This radial motion to axial input motion phase difference of 0° is important in distinguishing the rotary horn of the present invention from conventional horns such as those described in U.S. Pat. No. 5,707,483 to Nayar et al. and U.S. Pat. No. 5,096,532 to Neuwirth et al. The rotary horn of U.S. Pat. No. 5,707,483 relies on the Poisson Ratio Effect to excite a radial resonant section. In this device, the rotary motion will therefore be 180° out of phase with the input motion. The rotary horn of U.S. Pat. No. 5,096,532 relies purely on the Poisson Ratio Effect in which the radial motion is also 180° out of phase with the input motion.

Effects of Inner and Outer Taper Angles

Returning now to FIG. 1, it can generally be seen that the inner tapered surface 18 forms an inner angle with respect to the axis 24 of the horn 10, and that the outer tapered surface 20 forms an outer angle with respect to the axis 24. It is important to note that the inner angle is preferably different from the outer angle although they can be the same. Tailoring these angles to meet the welding requirements of the particular application enables the conversion of pure axial motion into radial motion. Thus, the first axial acoustic energy 16 is "resolved" into energy that has both a radial component and an axial component. In the preferred embodiment, the outer angle is approximately 10 degrees and the inner angle is approximately 12.5 degrees. Using well known FEA techniques, the angles can be designed to keep undesirable bending frequencies away from the primary resonance of the horn 10.

Figure 2:
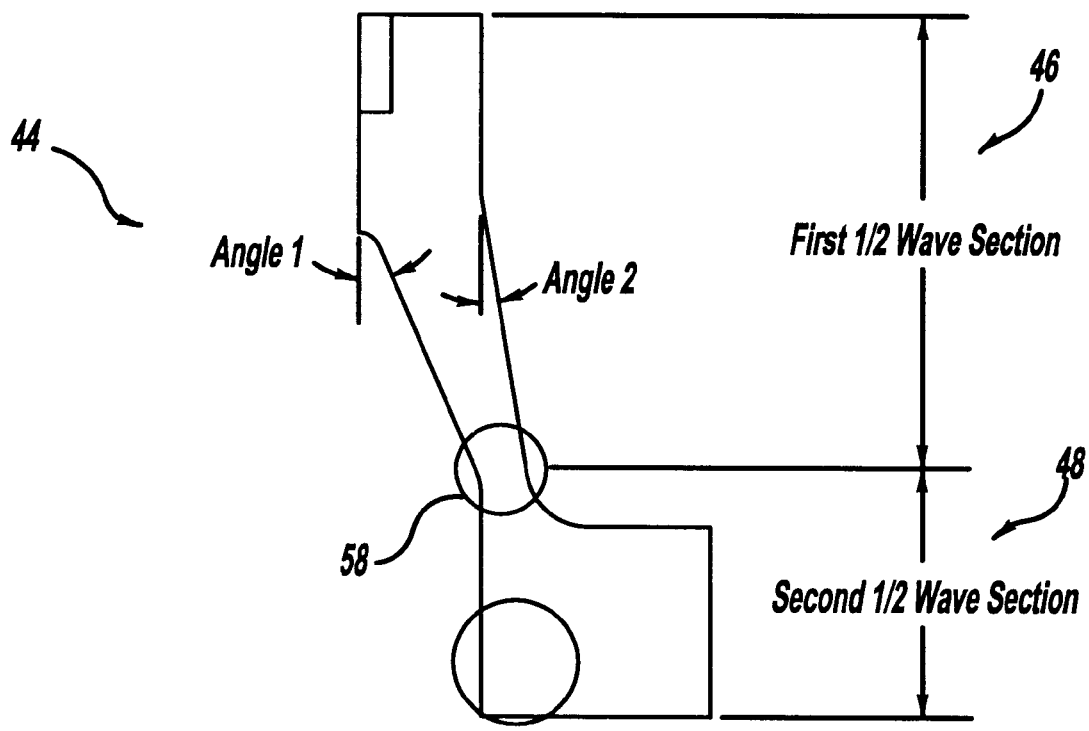
FIG. 2 is an axisymmetric view of a half section of a rotary horn according to one embodiment of the present invention.

Specifically, as best seen in FIG. 2, the inner and outer angles are driven partly by the geometry constraints of the half section 44 horn and partly by the effects of required outside diameter and radial to axial gain. The descriptions and explanations below will be primarily for 20 kHz.

The inner taper angle (Angle 1) is based largely on the inner diameter of the radially oscillating cylinder (the second half wavelength section 48). In order to most easily machine the inner diameter, this angle should have a minimum inner diameter ("ID") of 2". This 2" ID should extend from the bottom of the half section 44 to the approximate location of the transition area 58. The top portion of the half section 44 is basically fixed as a half wavelength axial resonator. When Angle 1 is made to be about 22.5°, enough material is left in the straight axial input section to not cause stress problems when a joining stud is inserted in this area. The angle does not have to be precisely 22.5° for the design to operate. Deviations in this angle are acceptable as long as the stress of the horn material can be controlled to not exceed fatigue limits.

The outer taper angle (Angle 2) is based largely on the desired horn gain and required radial outer diameter ("OD"). In the preferred embodiment, Angle 2 is made to be approximately 10°. Reducing this angle could lead to difficulties in achieving adequate cross section in the transition area 58. If too little cross section exists, the fatigue stress in this area will exceed the limits of the material. Increasing the angle from 10° will have the following effects:

1 ) Gain will be reduced;

2) Increased axial motion will become apparent at the radial weld face; and

3) Horn OD will need to be increased in order to keep the same resonant frequency.

Figure 6:
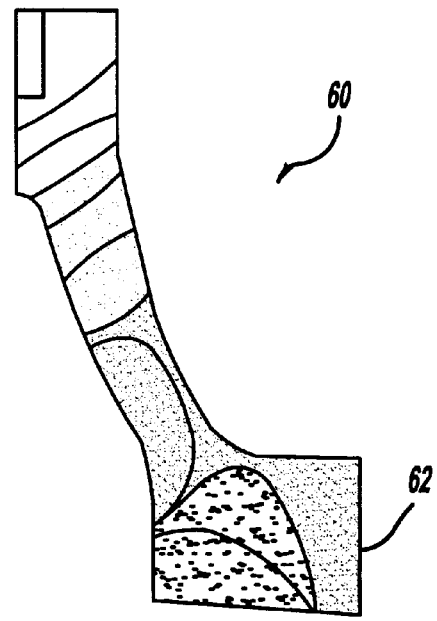
FIG. 6 is a FEA plot of a half section showing axial displacements according to an alternative embodiment of the present invention.
Figure 7:
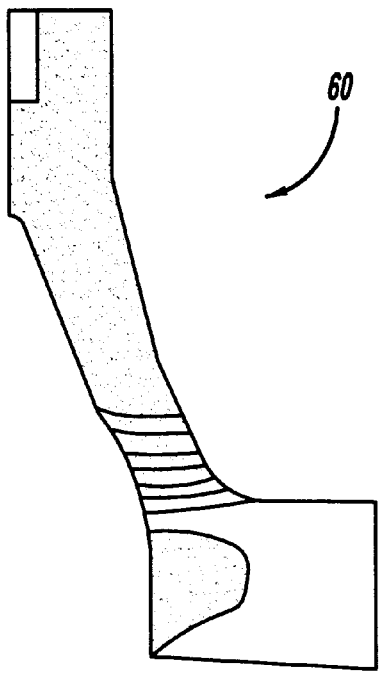
FIG. 7 is a FEA plot of a half section showing radial displacements according to an alternative embodiment of the present invention.
Figure 8:
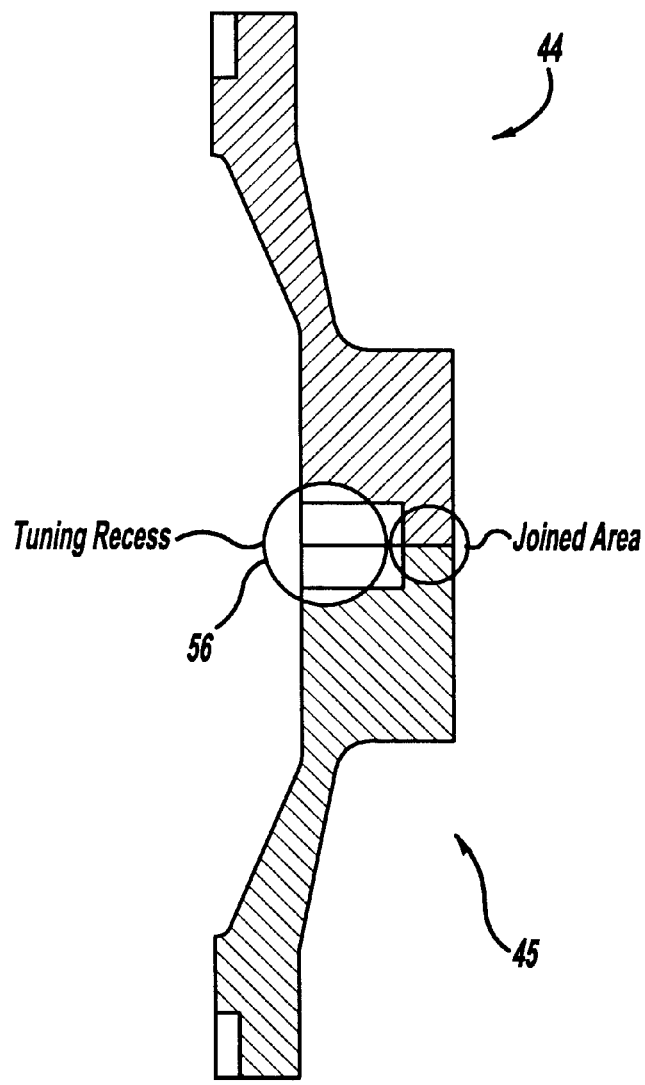
FIG. 8 is a FEA plot of two half sections of a rotary horn according to a preferred embodiment of the present invention.

FIGS. 6 and 7 show a half section 60 in which Angle 2 is increased from 10° to 15°. The OD requires a change from 5.5" to 5.7" to compensate for frequency changes. The axial displacement plot of FIG. 6 shows an increase in axial displacement at the radial weld face 62. This effect is undesirable since typically only pure radial motion is desired. The horn gain (axial input displacement to output radial displacement) in this configuration has dropped from an original value of 1.2 (10° angle horn) to 0.8. It has been found that the 10° angle is optimal in minimizing axial weld face motion and maximizing radial-axial gain.

Operational Theory of the Full Rotary Horn

Thus, returning to FIG. 1, it can be seen that the first radial weld section 12 and the first axial input section 14 define a first half 28 of the rotary horn 10. The rotary horn 10 further includes a second half 30 coupled to the first half 28 for converting a second axial acoustic energy 32 into the radial acoustic energy 22. The second half 30 is identical to the first half 28 and provides a number of additional benefits. Specifically, the second half 30 has a second radial weld section 34 and a second axial input section 38 for receiving a second axial acoustic energy 32. The second axial input section 38 has an inner tapered surface 40 and an outer tapered surface 42. Thus, by combining two horns a symmetric horn can be obtained as well as improved weld area lengths and amplitude uniformities. For example, since the halves 28, 30 are 180 degrees out of phase with one another, two ultrasonic motion sources (such as a booster and a converter) can be used to drive the horn 10. On the other hand, an ultrasonic motion source from only one side could also successfully operate the horn.

An axisymmetric sectional diagram of the full rotary horn is shown in FIG. 7. The full rotary horn includes the two symmetrical half sections 44, 45 joined together at the rotary motion areas. For the joining process of the two sections 44, 45 to work, motion at the joined sections needs to be compliant (i.e., moving in the same direction).

The two symmetrical sections 44, 45 are preferably joined together using an electron beam welding technique in the joined area. The overall 2-piece design enables ease of manufacture with reduced machining.

Normal operation of the horn would consist of each input area moving 180° out of phase with the other (using the traditional coordinate system) or each input face would be moving away from the center point of the horn at the same time. This would allow each input area to be powered by a converter, which operates on the same voltage waveform. From these input motions the radial face from both half sections 44, 45 would move in the positive X direction. At the same time the axial motion area on the bottom of the upper half section 44 would be moving in the positive Y direction and the axial motion on the top of the lower half section 54 would be moving in the negative Y direction. A FEA plot showing these displacements is shown in FIG. 9.

Figure 9:
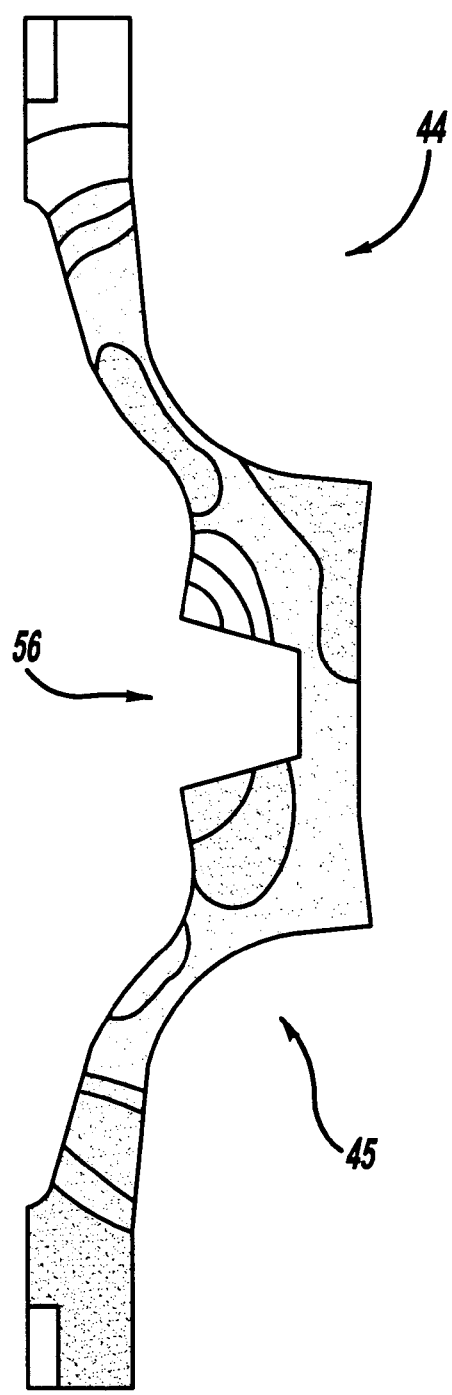
FIG. 9 is a FEA plot of two half sections during excitation according to a preferred embodiment of the present invention.

FIG. 9 shows that while the radial motions from each half section are compliant, the motions from the axial motions are not. In other words the upper symmetrical axial motion section moves in the positive Y direction while the lower symmetrical section moves in the negative Y direction. The fact that these axial motions are not compliant to one another shows the purpose of the tuning recess 56. Without the recess 56, the non-compliant axial motions of the two half sections 44, 45 would interfere with the proper motion of the horn. The axial motion within the radial oscillating sections of each half section needs to be free to oscillate in order to properly store the axial energy.

The two critical dimensions for this feature are in the X and Y directions. Variations in these dimensions control the following effects:

1) Radial weld face uniformity (min. radial amplitude/ max. radial amplitude); and
2) Control of undesirable bending frequencies which exist above and below the primary resonance frequency.

A table showing the effects of dimension modifications is shown below.

|  | Upper Bend f | Horn f | Local Radial Amplitude | Uniformity |
| --- | --- | --- | --- | --- |
| Greater Y | Decreases | Decreases | N/A | Increases |
| Less Y | Increases | Increases | N/A | Decreases |
| Greater X | Decreases | No change | Increases | N/A |
| Less X | Increases | No change | Decreases | N/A |

The X and Y dimensions need to be modified when different radial weld surface lengths are desired. The above figures show a 20 kHz full horn with a weld surface of 4.5". The 20 kHz horn weld surface can be extended to lengths up to 5.5". At lengths above this the outer radial weld surface begins to oscillate in an axial fashion by itself (it is at the tuned half wavelength for an axial resonator).

With continuing reference to FIG. 1, it can be seen that in addition to providing the option of multiple motion sources, the use of two axial input sections enables support of the rotary horn 10 from two polar mounts. Mounting could also be achieved through the attachment of two boosters to each half of the horn 10. It is important to note that the use of two mounting areas allows a greater pressure to be applied to the radial welding face. Greater pressure enables greater amounts of power to be imparted to the weld area per unit time. A direct benefit of this horn mounting technique, therefore, would be the increase of throughput rates for the parts being welded.

It can therefore be seen that fabricating the horn 10 in two symmetric halves 28, 30 facilitates the ease of manufacture. It is preferred that each half 28, 30 is machined individually and then welded together, as is shown in commonly owned U.S. Pat. No. 5,095,188. Once welded together, the radial section made up of the first radial weld section 12 and the second radial weld section 34, represents a thick cylinder which is tuned to the desired oscillating frequency. It is important to note that the axial length of this cylinder can be as great as approximately five inches.

Furthermore, enhanced amplitude uniformity is achieved through the use of a tuning cut at the inner diameter near the axial length center. The depth and height of this cut relative to the outer diameter will determine the amount of uniformity of the outer welding surface. Thus, the radial weld sections 12, 34 have a plurality of tuning surfaces 36 defining a tuning cut such that the radial weld sections 12, 34 have a predetermined amplitude uniformity. In most configurations, the tuning cut can be used to create radial weld surface uniformities of 85 percent or greater. While the above discussion relates to dimensions for a 20 kHz tuned resonant horn, the horn 10 could be scaled to any ultrasonic frequency ranging from about 10 kHz to about 60 kHz. Final tuning of the ultrasonic rotary horn 10 can be achieved through a final machining cut (not shown) on the outer diameter. The final machining cut further provides for a smooth radial welding surface. Thus, the radial weld sections 12, 34 can also have an outer cylindrical surface with outer tuning surfaces (not shown) defining an outer tuning cut. The outer tuning cut can be machined in accordance with any number of well-known approaches. One such approach is shown in U.S. Pat. No. 5,096,532 to Neuwirth, et al., incorporated herein by reference.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An ultrasonic rotary horn comprising:
   a first radial weld section; and
   a first axial input section operatively coupled to the first radial weld section for receiving a first axial acoustic energy;
   said first axial input section having a first hollow coned section including an inner tapered surface forming an inner angle with respect to an axis of the horn and an outer tapered surface forming an outer angle with respect to the axis of the horn, wherein said inner angle is different from said outer angle such that the first axial input section and the first radial weld section convert a portion of the first axial acoustic energy into radial acoustic energy, the radial acoustic energy being in phase with the first axial acoustic energy.

2. The rotary horn of claim 1 wherein the inner angle is approximately 12.5 degrees and the outer angle is approximately 10 degrees.

3. The rotary horn of claim 1 wherein the first axial input section further includes a first straight section operatively coupled to the first hollow coned section for receiving the first axial acoustic energy.

4. The rotary horn of claim 1 wherein the first radial weld section and the first axial input section define a first half of the rotary horn, the rotary horn further including a second half coupled to the first half for converting a portion of a second axial acoustic energy into radial acoustic energy, the first half being identical to the second half.

5. The rotary horn of claim 4 where the radial acoustic energy is in phase with the second axial acoustic energy.

6. The rotary horn of claim 4 wherein the radial weld sections have a combined radial weld area length of approximately five inches.

7. The rotary horn of claim 4 wherein the radial acoustic energy has a frequency in a range of approximately 10 kHz to approximately 60 kHz.

8. The rotary horn of claim 7 wherein the radial acoustic energy has a frequency of approximately 20 kHz.

9. The rotary horn of claim 4 wherein the radial weld sections have a plurality of tuning surfaces defining a tuning cut such that the radial weld section has a predetermined amplitude uniformity.

10. An ultrasonic rotary horn comprising:
a first half having a first radial weld section and a first axial input section for receiving a first axial acoustic energy; and
a second half coupled to the first half, the second half having a second radial weld section and a second axial input section for receiving a second axial acoustic energy;
each said half having a hollow coned section including an inner tapered surface forming an inner angle with respect to an axis of the horn and an outer tapered surface forming an outer angle with respect to the axis of the horn, wherein each inner angle is different from each corresponding outer angle such that the halves convert a portion of the first and second axial acoustic energy into radial acoustic energy.

11. The rotary horn of claim 10 wherein each inner angle is approximately 12.5 degrees and each outer angle is approximately 10 degrees.

12. The rotary horn of claim 10 wherein the radial weld sections have a combined radial weld area length of approximately five inches.

13. The rotary horn of claim 10 wherein the radial acoustic energy has a frequency in a range of approximately 10 kHz to approximately 60 kHz.

14. The rotary horn of claim 13 wherein the radial acoustic energy has a frequency of approximately 20 kHz.

15. The rotary horn of claim 10 wherein the radial weld sections have a plurality of tuning surfaces defining a tuning cut such that the radial weld section has a predetermined amplitude uniformity.

16. The rotary horn of claim 10 further comprising means for mounting said horn such that weld pressure and transfer of acoustic energy to said weld sections is increased.

17. An ultrasonic rotary horn comprising:
a first radial weld section; and
a first axial input section operatively coupled to the first radial weld section for receiving a first axial acoustic energy;
said first axial input section having a first coned section such that the first axial input section and the first radial weld section convert a portion of the first axial acoustic energy into radial acoustic energy, the radial acoustic energy being in phase with the first axial acoustic energy;
said first coned section having an inner tapered surface forming an inner angle with respect to an axis of the horn, and an outer tapered surface forming an outer angle with respect to the axis of the horn;
wherein the inner angle is approximately 12.5 degrees and the outer angle is approximately 10 degrees.

18. An ultrasonic rotary horn comprising:
a first half having a first radial weld section and a first axial input section for receiving a first axial acoustic energy; and
a second half coupled to the first half, the second half having a second radial weld section and a second axial input section for receiving a second axial acoustic energy;
each said half having a coned section such that the halves convert a portion of the first and second axial acoustic energy into radial acoustic energy;
each said coned section having an inner tapered surface forming an inner angle with respect to an axis of the horn, and an outer tapered surface forming an outer angle with respect to the axis of the horn;
wherein each inner angle is approximately 12.5 degrees and each outer angle is approximately 10 degrees.

* * * * *